(12) United States Patent
Zhao et al.

(10) Patent No.: US 11,556,648 B2
(45) Date of Patent: *Jan. 17, 2023

(54) MACHINE LEARNING MODEL FOR MALWARE DYNAMIC ANALYSIS

(71) Applicant: Cylance Inc., Irvine, CA (US)

(72) Inventors: Xuan Zhao, Irvine, CA (US); Aditya Kapoor, Portland, OR (US); Matthew Wolff, Laguna Niguel, CA (US); Andrew Davis, Portland, OR (US); Derek A. Soeder, Irvine, CA (US); Ryan Permeh, Laguna Hills, CA (US)

(73) Assignee: Cylance Inc., San Ramon, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 16/867,440

(22) Filed: May 5, 2020

(65) Prior Publication Data

US 2020/0265139 A1    Aug. 20, 2020

Related U.S. Application Data

(63) Continuation of application No. 15/588,131, filed on May 5, 2017, now Pat. No. 10,685,112.

(Continued)

(51) Int. Cl.
*H04L 9/40* (2022.01)
*G06F 21/56* (2013.01)
(Continued)

(52) U.S. Cl.
CPC ......... *G06F 21/566* (2013.01); *G06N 3/0445* (2013.01); *G06N 3/08* (2013.01);
(Continued)

(58) Field of Classification Search
CPC ...... G06F 21/566; G06N 3/0445; G06N 3/08; G06N 3/048; G06N 5/025; G06N 5/003;
(Continued)

(56) References Cited

U.S. PATENT DOCUMENTS 8,401,982 B1 * 3/2013 Satish .................... G06N 20/00
                                                    706/20
8,973,141 B2 * 3/2015 Rowland ................. H04L 63/08
                                                    726/25

(Continued)

OTHER PUBLICATIONS

Pascanu et al., "Malware classification with recurrent networks," 2015 IEEE International Conference on Acoustics, Speech and Signal Processing (ICASSP), pp. 1916-1920 (Apr. 19, 2015).

(Continued)

*Primary Examiner* — Khoi V Le
(74) *Attorney, Agent, or Firm* — Jones Day

(57) ABSTRACT

In some implementations there may be provided a system. The system may include a processor and a memory. The memory may include program code which causes operations when executed by the processor. The operations may include analyzing a series of events contained in received data. The series of events may include events that occur during the execution of a data object. The series of events may be analyzed to at least extract, from the series of events, subsequences of events. A machine learning model may determine a classification for the received data. The machine learning model may classify the received data based at least on whether the subsequences of events are malicious. The classification indicative of whether the received data is malicious may be provided. Related methods and articles of manufacture, including computer program products, are also disclosed.

18 Claims, 7 Drawing Sheets

Related U.S. Application Data

(60) Provisional application No. 62/332,380, filed on May 5, 2016.

(51) Int. Cl.
*G06N 3/08* (2006.01)
*G06N 20/00* (2019.01)
*G06N 3/04* (2006.01)
*G06N 5/02* (2006.01)
*G06N 7/00* (2006.01)
*G06F 3/048* (2013.01)
*G06N 5/00* (2006.01)
*G06N 20/20* (2019.01)
*G06N 20/10* (2019.01)

(52) U.S. Cl.
CPC ............. *G06N 5/025* (2013.01); *G06N 7/005* (2013.01); *G06N 20/00* (2019.01); *H04L 63/145* (2013.01); *G06F 3/048* (2013.01); *G06N 5/003* (2013.01); *G06N 20/10* (2019.01); *G06N 20/20* (2019.01)

(58) Field of Classification Search
CPC ........ G06N 7/005; G06N 20/00; G06N 20/10; G06N 20/20; H04L 63/145
See application file for complete search history.

(56) References Cited

U.S. PATENT DOCUMENTS

| | | | |
|---|---|---|---|
| 9,235,729 B2 | 1/2016 | Robison | |
| 9,773,112 B1* | 9/2017 | Rathor | ................... G06F 21/554 |
| 2011/0185230 A1* | 7/2011 | Agrawal | ............. G06F 11/0751 |
| | | | 714/E11.029 |
| 2011/0302654 A1* | 12/2011 | Miettinen | ............. G06F 21/552 |
| | | | 726/23 |
| 2014/0089682 A1 | 3/2014 | Gulati | |
| 2014/0089712 A1 | 3/2014 | Machniki | |
| 2014/0090061 A1 | 3/2014 | Avasarala et al. | |
| 2014/0279762 A1* | 9/2014 | Xaypanya | ................... H04L 63/145 |
| | | | 706/12 |
| 2015/0058988 A1* | 2/2015 | Katz | ................... H04L 63/1416 |
| | | | 726/23 |

OTHER PUBLICATIONS

Non-Final Office Action issued for U.S. Appl. No. 15/588,131, dated Jan. 8, 2020 (16 pages).
Final Office Action issued for U.S. Appl. No. 15/588,131, dated Jun. 25, 2019 (16 pages).
Non-Final Office Action issued for U.S. Appl. No. 15/588,131, dated Apr. 15, 2019 (18 pages).

\* cited by examiner

MACHINE LEARNING MODEL FOR MALWARE DYNAMIC ANALYSIS

RELATED APPLICATION

This application is a continuation of U.S. patent application Ser. No. 15/588,131, filed May 5, 2017, which claims benefit of to U.S. Provisional Application No. 62/332,380 entitled "MACHINE LEARNING MODEL FOR MALWARE DYNAMIC ANALYSIS" and filed on May 5, 2016, each of which is incorporated by reference herein in its entirety.

TECHNICAL FIELD

This disclosure relates generally to data processing and, in particular, to a malware detection and analysis.

BACKGROUND

In today's world, many companies rely on computing systems and software applications to conduct their business. Computing systems and software applications deal with various aspects of companies' businesses, which can include finances, product development, human resources, customer service, management, and many other aspects. Businesses further rely on communications for a variety of purposes, such as, exchange of information, data, software, and other purposes. Computing systems/software are frequently subject to cyberattacks by viruses, malicious software or malware, and/or other ways that can be highly disruptive to operations of the computing systems/software. Malware can disrupt computer operations, gather sensitive information, and/or gain access to private computer systems. Malware is typically defined by its malicious intent and does not include any software that may cause unintentional harm due to some deficiency.

Malware typically operates in a stealthy mode and can steal information and/or spy on computer users during a particular period of time, which can be an extended period of time. Moreover, malware can operate without knowledge of the users and can therefore cause significant harm, including sabotage of computing system, extortion of payment, and/or the like. Types of malware can include, for example, computer viruses, worms, Trojan horses, ransomware, spyware, adware, scareware, and other malicious programs. Malware can be in the form of executable code, scripts, active content, and/or other types of software. In order to gain access to computing systems, malware is often disguised as, or embedded in, non-malicious files. Often, malware can be found embedded in programs that are downloadable from websites, which can be useful or attractive to a user, but have hidden tracking functionalities that gather marketing statistics.

A variety of methods have been implemented in the computing world to fight against malware and its variants. These include anti-virus and/or anti-malware software, firewalls, and/or the like. These methods can actively and/or passively protect against malicious activity and/or can be used to recover from a malware attack. However, conventional methods may not be capable of effectively and/or accurately detecting malware as well as timely preventing potential damage that can be caused to computing systems and/or software that have been subject to an attack. Thus, there is a need for dynamically detecting and analyzing malware in order to provide proper protection against malware.

SUMMARY

In some implementations there may be provided a system. The system may include at least one processor and at least one memory including program code which when executed by the at least one processor causes operations comprising: analyzing a series of events contained in received data, the series of events comprising events that occur during the execution of a data object, and the series of events being analyzed to at least extract, from the series of events, one or more subsequences of events; determining, by a machine learning model, a classification for the received data, the machine learning model classifying the received data based at least on whether the one or more subsequences of events are malicious; and providing the classification indicative of whether the received data is malicious.

In some variations, one or more of the features disclosed herein including the following features may optionally be included in any feasible combination. The one or more subsequences of events may be extracted by at least: determining a plurality of subsequences in the series of events; identifying a plurality of most frequent subsequences in the plurality of subsequences; and selecting, from the plurality of the most frequent subsequences, the one or more subsequences of events. The selecting of the one or more subsequence of events may be based on a frequency of occurrence of the plurality of most frequent subsequences exceeding a predetermined threshold.

In some variations, the plurality of the most frequent subsequences may be identified by at least applying an Apriori algorithm. The Apriori algorithm may be configured to at least: identify a most frequent event; and identify, based at least on the most frequent event, a most frequent subsequence of events, the most frequent subsequence of events including the most frequent event and at least one other event.

In some variations, the machine learning model may be a recurrent neural network. The recurrent neural network may be a long short term memory network. The long short term memory network comprises a memory cell, the memory cell being configured maintain a value, the memory cell being further configured to determine, based at least on an event, whether to update, output, discard, and/or continue to maintain the value.

In some variations, the machine learning model may determine the classification for the received data by at least: generating a representation the one or more subsequences of events; determining an average representation of the one or more subsequences of events over a plurality of time steps associated with the series of events; determining a logistic regression of an average representation of the one or more subsequences of events; and determining, based on the logistic regression, the classification for the received data.

In some variations, the system may be further configured to: determine whether the series of events includes at least one malicious event; and classify the received data based at least on a presence of the at least one malicious event in the series of events. An event may be determined to be malicious based at least on a filename and/or a filepath associated with the event. The filename and/or the filepath associated with the event may be analyzed based at least on a pattern associated with one or more filenames and/or filepaths that are known to be non-malicious. The pattern associated with the one or more non-malicious filenames and/or filepaths may be modeled using a Markov chain.

In some variations, the one or more subsequence of events may include consecutive and/or non-consecutive events from the series of events. The data object may be a file, a function, and/or a software program.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods may be implemented by one or more data processors either within a single computing system or distributed among two or more computing systems. Such computing systems may be connected and may exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
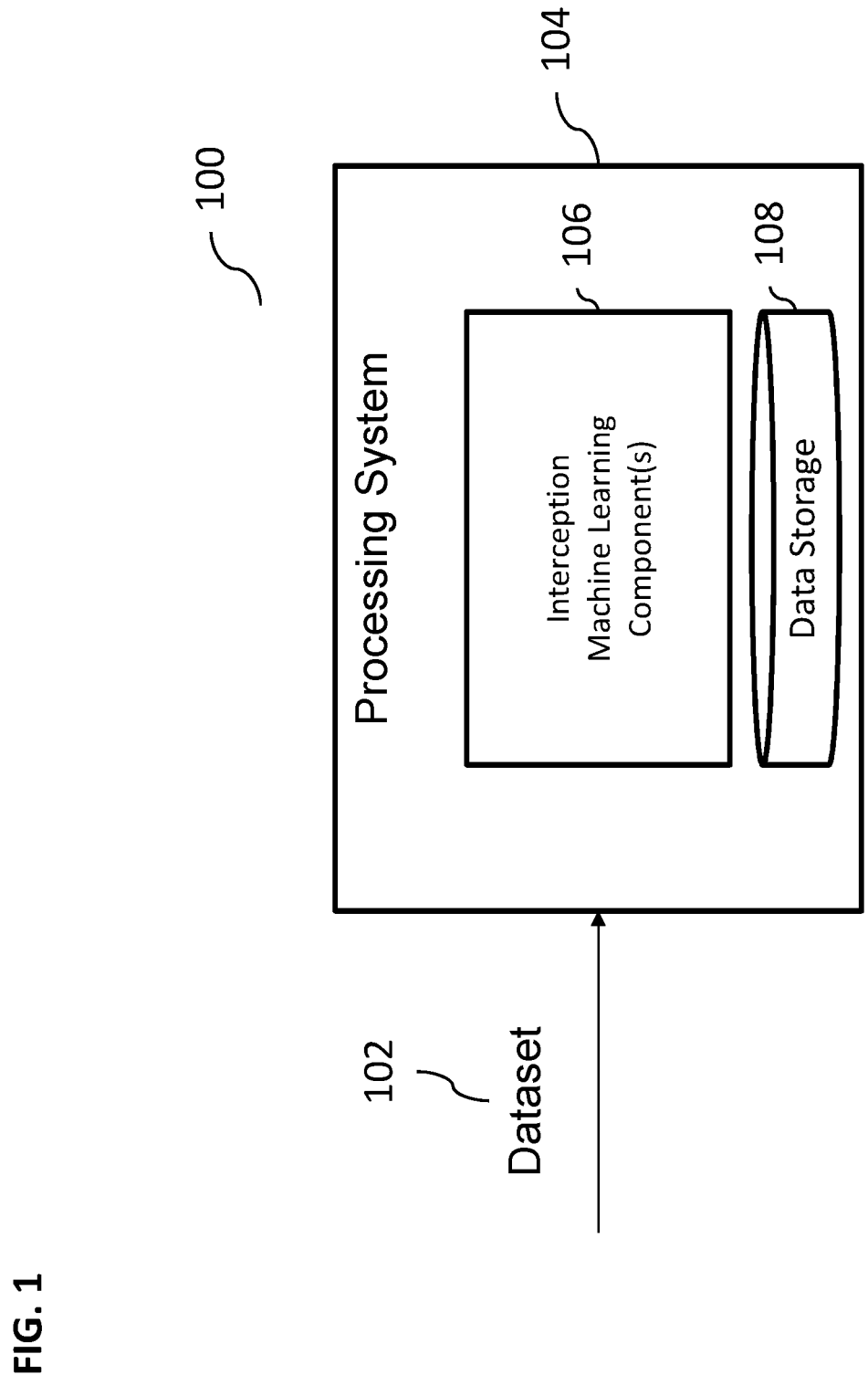
FIG. 1 illustrates an example of a system for processing a dataset to determine the presence of malicious events, according to some implementations of the current subject matter.

In some implementations, the current subject matter relates to performing dynamic analysis of data to detect malware based on machine learning. Conventional systems that perform static analysis of data may not detect malware with sufficient success and/or accuracy. The current subject matter's dynamic analysis may be configured to determine malware functionality. Furthermore, the current subject matter's dynamic analysis may capture and record additional information associated with the malware including, for example, registry, file, network, mutex, application programming interface (API), and/or the like. In doing so, the current subject matter's dynamic analysis may provide a more detailed resource on the malware's behavior during execution.

In some implementations, the current subject matter's analysis may perform analysis of time series data that includes a series of events that occur during the execution of a data object such as, for example, a file, a function, a program, and/or like. A chronological order of events occurring during the execution of the data object may be used to determine whether the data object is malicious and/or includes malicious content. However, it should be appreciated correlated events within the series of events may not be consecutive. That is, an event may be not be correlated with events that immediately precede and/or follow the event. Instead, one or more other events may happen between two correlated events. Some approaches (e.g., Autoregressive Moving Average ("ARMA"), Hidden Markov Model ("HMM"), Markov Chain, Sliding Window, and/or the like) to analyzing time series data are limited to analysis of consecutive events. As such, the current subject matter may recognize the correlation between non-consecutive events in time series data associated with the execution of a data object. Alternately and/or additionally, the current subject matter may analyze data that contains unknown events (e.g., new sequences of events) and/or having a different number of events in each data sample.

In some implementations, the current subject matter may classify the data object based on subsequences of correlated events that appear in the time series data associated with the execution of the data object. The data object may be classified as malicious when the time series data associated with the execution of the data object includes malicious subsequences of events. As noted earlier, the time series data may include correlated events that are non-consecutive. For example, in the series of events axxxxxbxxxxxc (where "x" may stand for any arbitrary event), the events a, b, and c may be correlated. Furthermore, the occurrence of subsequence of events abc may be indicative of malware. However, the events the events a, b, and c are not consecutive because the events x occur between events a, b, and c. As such, the current subject matter may extract subsequences of events by applying, to the series of events, a frequent sequence mining technique such as, for example, an Apriori algorithm, a frequent pattern (FP) growth algorithm, an Eclat algorithm, a recursive elimination (Relim) algorithm, a split and merge (SaM) algorithm, and/or the like. Furthermore, a machine learning model may be used to classify the data object based on the extracted subsequences of events. For example, the machine learning model may be configured to determine whether any of the subsequences of events is malicious. The classification of the data object may correspond to whether any of the subsequences of events is malicious.

It should be appreciated that the current subject matter contemplates the use of any machine learning model. For example, the machine learning model may be a random forest. Alternately and/or additionally, the machine learning model may be one or more variants of a recurrent neural network (RNN) such as, for example, a long short-term memory (LSTM) network. A long short term memory network may be configured to have longer memories, thereby overcoming the vanishing gradient problem associated with other variants of recurrent neural networks. Accordingly, a long short term memory network may be used to handle scenarios where there are long time lags of unknown size between correlated events. The long short term memory network structure may allow in-time classification, whereby the network may remember what happened before. Whenever a new event is detected, the long short term memory network may combine its memory and the new event together to provide a new classification result.

In some implementations, the current subject matter may also classify the data object based on details that may be associated with individual events that appear in the time series data associated with the execution of the data object. For example, certain details associated with an event may be indicative of a malicious event. Meanwhile, the presence of a single malicious event may further render the entire series of events malicious. By way of a non-limiting example, in a dropFile event, if the file dropped has an entirely random name, then that dropFile event may be deemed malicious. Other non-limiting examples of details indicative of a malicious event may include establishing network communication with a bad Internet protocol (IP) addresses and/or a bad domain name server (DNS) names, modifying and/or editing certain registry entries, modifying firewall rules, injecting into the memory of another process, and/or the like.

For example, the individual events appear in the times series data may be analyzed by mapping each event to a point in a finite state space. For example, a state space may be {openProcess, AllocateVirtualMemory, WriteProcessMemory, createRemoteThread, dropFile}. The details of the event may be considered arguments to the element in the state space, which may mean that the same event with different arguments may be mapped to the same point in the state space. For example, the WriteProcessMemory event may include the arguments (processhandle, address). However, a WriteProcessMemory event with a different address argument and/or a different processhandle argument might not result in different points in the state space. Furthermore, the arguments passed to each individual event may be also analyzed by the current subject matter. For example, a dropFile event may include arguments (fileName, filePath, fileSize). If the software is dumping a file into system32, and/or the fileName is unusual and/or contains offensive words, and/or the dumped file itself is a malware, then a determination may be made that the dropFile event is malicious. Moreover, based on the presence of the malicious dropFile event, the current subject matter can further determine that the data object that triggered the dropFile event is also malicious.

In some implementations, the current subject matter may analyze/process a stream of data containing events from many different processes, in which events that are sequential may be related to different processes and, thus, mostly unrelated. The data stream may be broken down by process and/or other method to ensure that the data is sequential and/or related.

FIG. 1 illustrates an example of a system 100 that may perform processing a dataset 102 to determine presence of malicious events, according to some implementations of the current subject matter. The system 100 may include a processing system 104, which may include interception and/or machine learning component(s) 106 and a data storage component 108. The dataset 102 may be any data, programs, functions, and/or the like that may be received by the processing system 104. The dataset 102 may be received by the processing system 104 via a communications network, e.g., an Internet, an intranet, an extranet, a local area network ("LAN"), a wide area network ("WAN"), a metropolitan area network ("MAN"), a virtual local area network ("VLAN"), and/or any other network. The dataset 102 may be received via a wireless, a wired, and/or any other type of connection. The processing system 104 may be implemented using software, hardware and/or any combination of both. The system 104 may also be implemented in a personal computer, a laptop, a server, a mobile telephone, a smartphone, a tablet, and/or any other type of device and/or any combination of devices. The interception and/or machine learning component(s) 106 may perform execution, compilation, and/or any other functions on the received dataset 102 as well as machine learning functions, as discussed in further detail below. The data storage component 108 may be used for storage of data processed by the system 104 and may include any type of memory (e.g., a temporary memory, a permanent memory, and/or the like).

In some implementations, the system 100 can be configured to determine the presence of malware in data such as, for example, the dataset 102 shown in FIG. 1. As noted earlier, the execution of the dataset 102 can generate time series data that includes a series of events. The series of events may include correlated events that are not necessarily consecutive. For example, in the series of events axxxxxbxxxxxc, the events a, b, and c may be correlated but are not consecutive because the events x occur between events a, b, and c. Thus, the system 100 can identify, in the series of events, subsequences of correlated events. Furthermore, the system 100 can determine whether malware is present in the dataset 102 based at least on these subsequences of correlated events.

Figure 2:
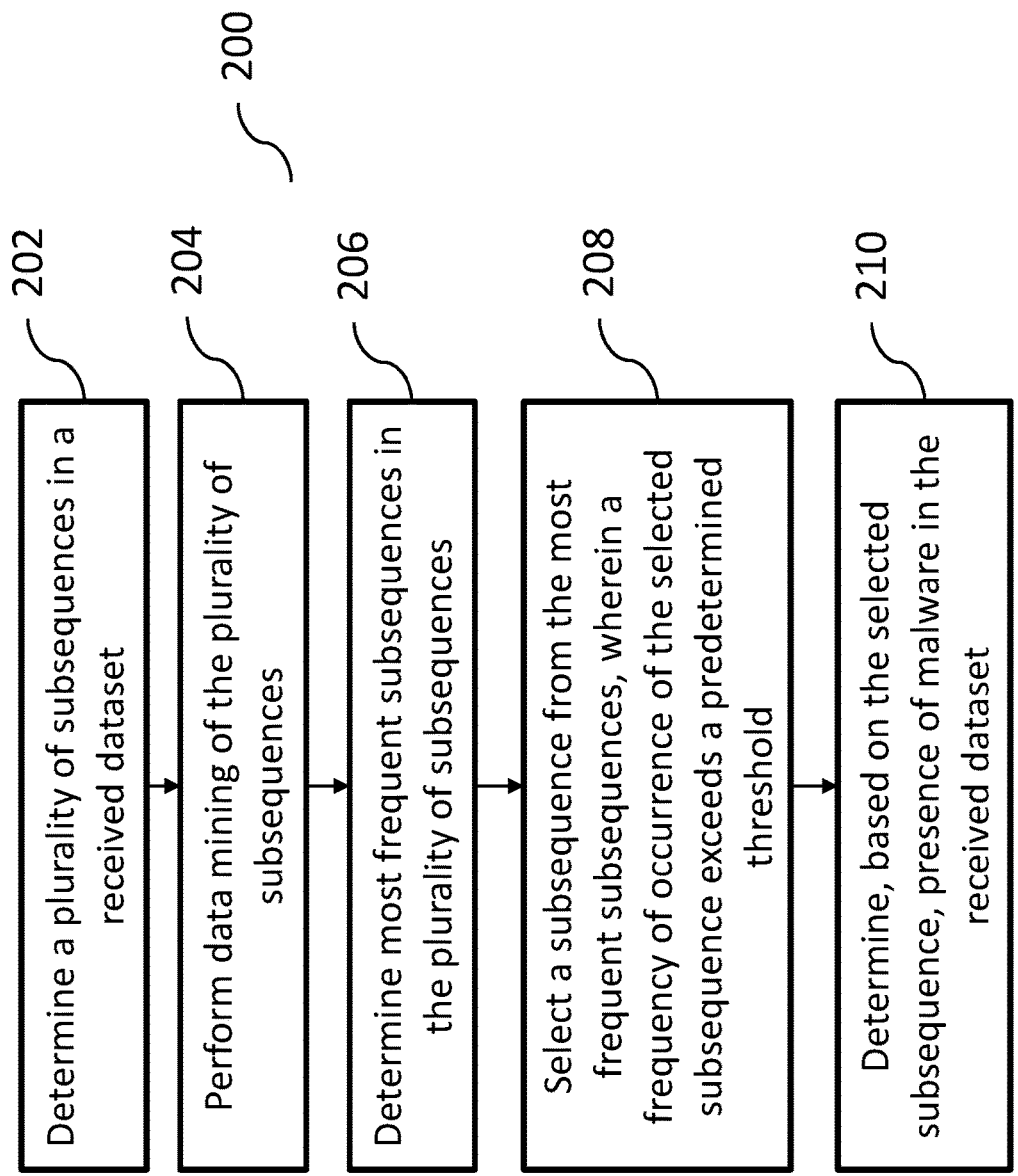
FIG. 2 illustrates an example of a process for determining the presence of malware in data, according to some implementations of the current subject matter.

To further illustrate, FIG. 2 illustrates an example of a process 200 that may be performed by the system 100 for determining presence of malware in data, such as, the dataset 102, according to some implementations of the current subject matter. At 202, once the dataset is received by the processing system 104, the dataset may be analyzed to determine a plurality of subsequences in the dataset. The determination may be made by the component 106 of the processing system 104. At 204, the component 106 may apply, to the determined plurality of subsequences, one or more frequent sequence mining techniques in order to identify the most frequently occurring subsequences. As noted earlier, these subsequences of events may contain correlated events that are not necessarily consecutive but are interspersed by other non-correlated events.

At 208, at least one subsequence may be selected from the most frequently occurring subsequences in the plurality of subsequences. The selection of this subsequence may be based on one or more predetermined thresholds. For instance, the one or more predetermined threshold may include a minimum support threshold value ("minsup"). That is, if occurrence of a subsequence of events exceeds the minimum support threshold value, then that subsequence of events may be selected for further analysis. By contrast, a subsequence of events may be excluded from further analysis if the occurrence of that subsequence of events does not exceed the minimum support threshold. In some example embodiments, the minimum support threshold value may be 70% and/or any other value. As used herein, the support value of a subsequence X may correspond to a proportion of samples which contain the subsequence X. Meanwhile, the minimum support threshold value may correspond to a minimum proportion of samples containing the subsequence X.

Alternately and/or additionally, the one or more predetermined thresholds may include a maximum support threshold value ("maxsup"). Here, a subsequence of events may be excluded from further analysis if the occurrence of that subsequence of events exceeds the maximum support threshold. This subsequence of events may be excluded from further analysis because frequently occurring subsequences may be considered non-malicious. It should be appreciated that the predetermined thresholds (e.g., the minimum support threshold and/or the maximum support threshold) may be optional, in which case the system 100 may select every subsequence of events for further analysis. Once the system 100 selects the at least one subsequence, the processing system 104 may determine, based on the at leaset one subsequence, whether malicious data is present in the dataset 102, at 210.

As noted earlier, the current subject matter may apply one or more frequent sequence mining techniques in order to identify the most frequent subsequences in a series of events. The series of events may be generated as a result of executing a data object such as, for example, a file, a function, a program, and/or the like. The series of of events may be denoted as follows:

$$S_i, \text{ where } i \text{ may be } \{1,2,\ldots,n\}.$$

All subsequences of events from the series of events $S_i$ may form a collection of subsequences denoted as follows:

$$Ci = \{subS_i^1, subS_i^2, \ldots, subS_i^n\}.$$

In some example embodiments, subsequences of events in the collection of subsequences Ci might not include consecutive events. For example, for a series of events $S_i$ that contains the events xyz, the collection of subsequences may Ci include {x, y, z, xy, xz, yz, xyz}. Notably, the collection of subsequences Ci includes the subsequence xz, which is formed from two non-consecutive events x and z.

To determine a subsequence set (i.e., subsequence set Q), a union of subsequences $C_i$ (where i may be $\{1, 2, \ldots, n\}$) may be formed as follows:

$$Q = \bigcup_{i=1}^{n} C_i$$

In some example embodiments, one or more frequent sequence mining techniques may be applied to the collection of subsequences Ci in order to identify the most frequently occurring subsequences within the collection. For example, the frequency sequence mining technique may be an Apriori algorithm. As used herein, the Apriori algorithm is an algorithm that may be used for frequent item set mining and association rule learning. The Apriori algorithm applies a bottom up approach to identifying the most frequently occurring subsequences in a collection of subsequences. However, it should be appreciated that other frequent sequence mining techniques may also be used including, for example, a frequent pattern growth algorithm, an Eclat algorithm, a recursive elimination algorithm, a split and merge algorithm, and/or the like.

To further illustrate, the Apriori algorithm may be used to determine the most frequently occurring subsequence set P in the subsequence set Q. The Apriori algorithm may start by identifying the frequent individual items in a database and extending them to larger item sets as long as the item sets appear sufficiently often in the database. The frequent item sets determined by Apriori may be used to determine association rules. To determine the most frequent subsequence in the subsequence set Q, the Apriori algorithm may generate candidate subsequence sets of length k from the subsequence sets of length k−1 and select candidates, which have an infrequent sub-pattern. The Apriori algorithm may be based on the following principle: if an itemset is frequent, then all of its subsets must also be frequent. In identifying most frequent itemsets, the Apriori algorithm may use one or more predetermined threshold values.

In some example embodiments, the predetermined threshold value may be a minimum support threshold of approximately 70%. Here, a subsequence of events must occur in at least 70% of samples in order to be selected as part of the most frequently occurring subsequence set P. In some example embodiments, the predetermined threshold value may determine which subsequences are selected. For example, fewer subsequences will be selected when the predetermined threshold value is high. Meanwhile, the subsequences that are selected will have a higher frequency of occurrence. It should be appreciated that the Apriori principle may hold due to the following property of the support measure:

$$\forall X, Y: (X \subseteq Y) \Rightarrow s(X) \geq s(Y).$$

In some implementations, the Apriori algorithm may greatly accelerate the process of selecting a frequent subsequence set. Once the frequent subsequence set P is selected from subsequence set Q using the above Apriori algorithm and predetermined threshold value (e.g., a minsup value of 70%), an inverse document (sample) frequency may be used to filter out the subsequences that are too frequent to be informative. An example of a subsequence of events that occur too frequently to be informative may be a subsequence that appears in all of the samples. As such, in some example embodiments, subsequences that occur in 90% of the samples may be filtered out while the remaining samples in the subsequence set P may be used to classify a corresponding data object. In some implementations, other data reduction techniques may be used, which may be independent of the machine learning model subsequently used to classify the data object based on the frequent subsequence set P.

As noted earlier, the current subject matter may classify a data object based on subsequences of events that appear in the time series data associated with the execution of the data object. For instance, the data object may be classified as malicious if the time series data associated with the execution of the data object includes a malicious subsequence of events. Thus, once the frequent subsequence set P is identified, the current subject matter may use one or more machine learning models to perform classification of the data object. In some example of a implementations, the classification may be performed using one or more machine learning algorithms such as, for example, random forests, logistic regression, support vector machines, neural networks, and/or the like. The machine learning models may be configured to avoid overfitting, provide feature importance, provides feature space reduction, interpret the result, verify the result, and/or the like.

In some implementations, the classification to identify the presence of malware in the data may be performed using a recurrent neural network. The recurrent neural network may be trained to discriminate between good and bad with a satisfactory level of performance. Automatically discovered features may be extracted by running a sample through the recurrent neural network and extracting a final hidden state $h_i$, wherein i is the number of instructions of the sample. This resulting feature vector may be concatenated with other hand-engineered features, and a larger classifier may be trained on hand-engineered and/or automatically determined features. In some implementations, data encapsulating a sample of at least a portion of one or more files may be received and/or accessed. Then, at least a portion of the received and/or accessed data may be fed as a time-based sequence into the recurrent neural network, which was trained using historical data. The recurrent neural network may extract a final hidden state $h_i$ in a hidden layer of the recurrent neural network in which i is a number of elements of the sample. Using the recurrent neural network and the final hidden state, a determination may be made whether a series of events include at least one malicious subsequence of events. The hidden state may be defined by $h_t=f(x, h_{t-1})$, wherein the hidden state $h_t$ is a time-dependent function of input x as well as a previous hidden state $h_{t-1}$. The recurrent neural network may be an Elman network, a long short term memory network, a clockwork recurrent neural network, a deep transition function, an echo-state network, and/or the like.

Figure 3:
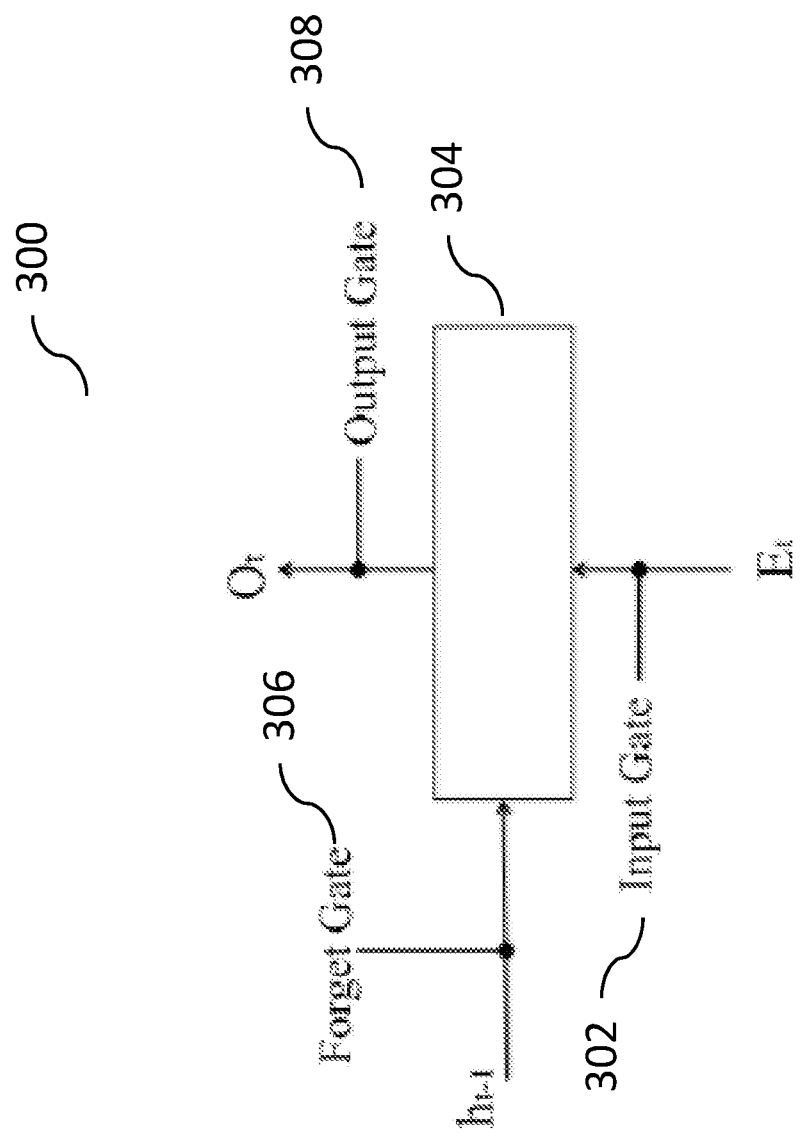
FIG. 3 illustrates an example of a memory cell structure.

In some implementations, the current subject matter may implement a long short term memory network with a mean pooling layer for the purposes of malware classification. It should be appreciated that the long short term memory network is a variant of a recurrent neural network. The long short term memory network may be formed using a memory cell structure. FIG. 3 illustrates an example of a memory cell structure 300. The memory cell structure 300 may include at least one of the following components: an input gate 302, a neuron with a self-recurrent connection 304, a forget gate 306 and an output gate 308. The gates may determine when an input is significant enough to remember, when the memory cell 300 should continue to remember and/or forget a particular value, and/or when it should output the value. Using the memory cell structure 300, a significant event, even if very remote back in time from the current event, may be kept in memory. Thus, the long short term memory network may handle a scenario when there are long time lags of unknown size between important events. Additionally, the long short term memory network may also handle scenarios when there is an event that is not necessarily most affected by the event immediately next to it and the most highly correlated event may be far back in time.

Figure 4:
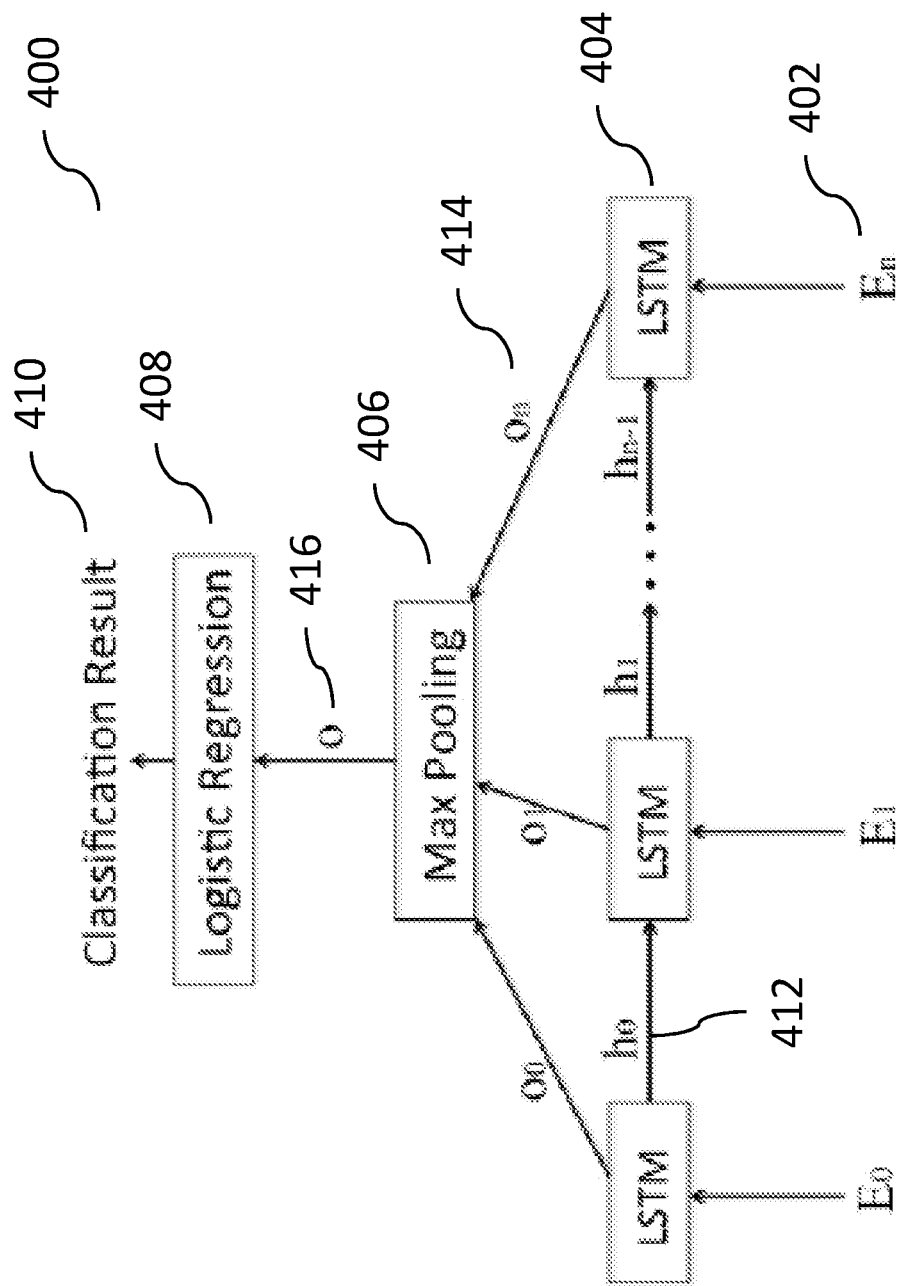
FIG. 4 illustrates an example of a long short term memory network, according to some implementations of the current subject matter.

FIG. 4 illustrates an example of a long short term memory network 400, according to some implementations of the current subject matter. The long short term memory network 400 may receive input event sequences $E_t$ 402, where t may be {0, 1, 2, . . . , n} and may include a long short term memory cell layer 404, a max pooling layer 406 and a logistic regression layer 410, which may output a classification result 412. The input event sequence 402 may be any input event sequence as discussed above. The long short term memory cell layer 404 may include one or more long short term memory cell nodes. Upon receiving the input event sequences $E_t$ 402, each long short term memory cell node in the long short term memory cell layer 404 may generate a respective representation sequence $O_t$ 414, where t may be {0, 1, 2, . . . , n}. The long short term memory cell layer 404 may include a layer of respective hidden states $h_t$ 412, where t may be {0, 1, 2, . . . , n}. The hidden or unobserved states may be passed from one long short term memory cell node to the next long short term memory cell node corresponding to the next time step t+1 in the long short term memory cell layer 404.

The representation sequence values $O_t$ may be averaged over all time steps t at the max pooling layer 406 to generate a representation O 416. The representation O 416 may be provided to the logistic regression layer 408, which may output a classification result 410. The classification result 410 may be used to determine presence of malware in the data.

In some implementations, the long short term memory cell nodes may share the same weight matrices, which may be determined using backpropagation. Backpropagation or backward propagation of errors may be used to train artificial neural networks in conjunction with an optimization method (e.g., gradient descent). The backpropagation method may calculate a gradient of a loss function with respect to all weights in the network and feed the calculated gradient to the optimization method, which may update the weights in order to minimize the loss function.

In some implementations, the long short term memory network 400 may allow updating classification results in a real-time manner. For example, at time t, an event $E_t$ may arrive. Both $E_t$ and $h_{t-1}$ from the memory cell of t−1 may be fed into the memory cell of time t. The long short term memory network 400 may then apply a running average over the representation sequence $h_0, h_1, h_2, \ldots, h_t$ to generate an average representation h. The averaged representation h may be fed into the logistic regression layer 408 to generate the classification result 410.

Figure 5:
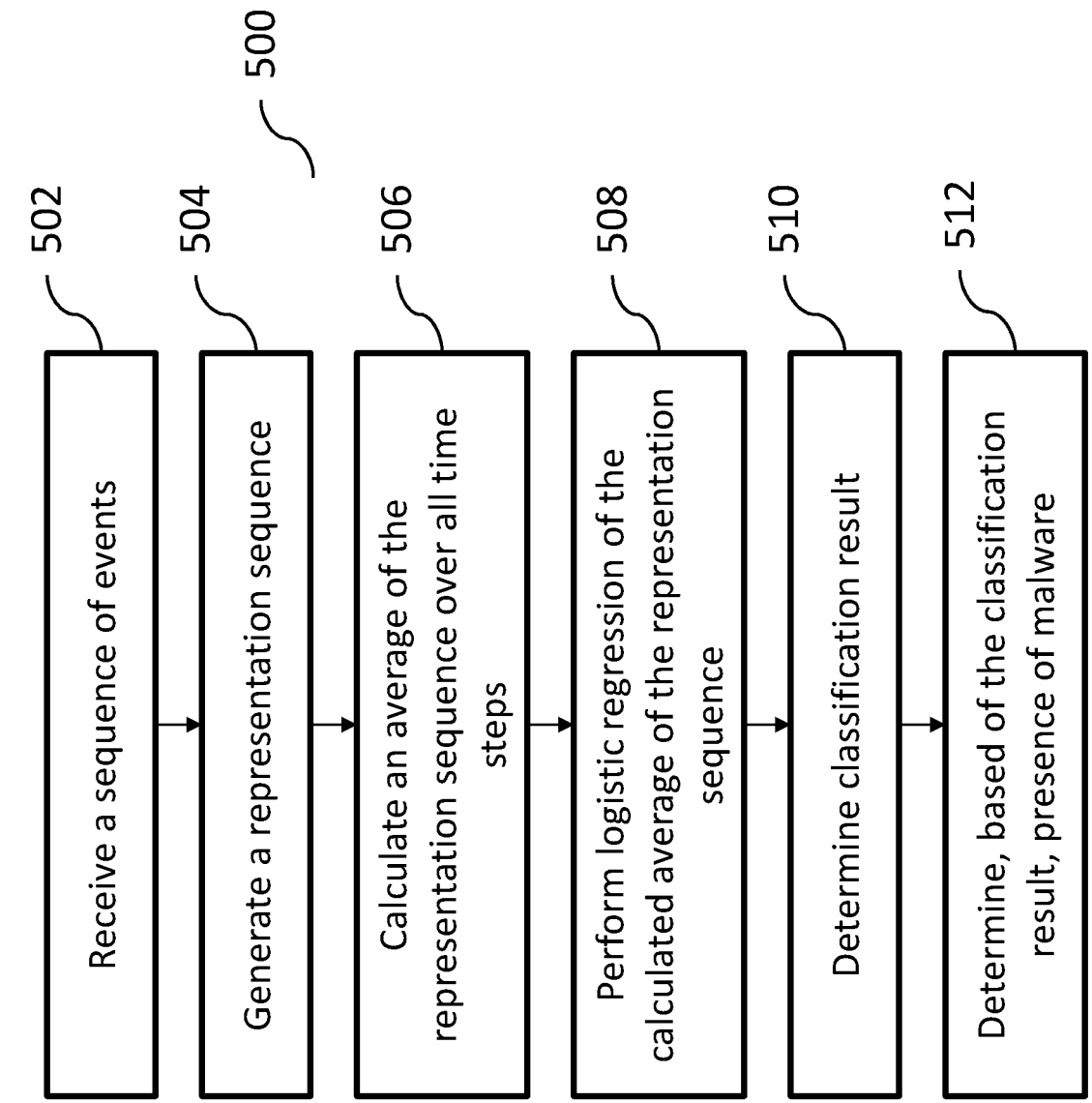
FIG. 5 illustrates an example of a process for classifying a data object using a long short term memory network, according to some implementations of the current subject matter.

As noted earlier, a long short term memory network, a variant of a recurrent neural network, may be used to classify a data object (e.g., a file, function, program, and/or the like) based on one or more subsequences of events that appear in a series of events that occur as a result of executing the data object. The data object may be classified as malicious if the long short term memory network determines that at least one of the subsequences of events is malicious. To further illustrate, FIG. 5 illustrates an example of a process 500 for classifying the data object using a long short term memory network, according to some implementations of the current subject matter. Referring to FIG. 5, the process 500 may be performed using the long short term memory network 400, as shown in FIG. 4.

At 502, a sequence of events may be received for determination of presence of malware. At 504, based on the received sequence of events, a representation sequence may be generated (e.g., representation sequence $O_t$ 414, as shown in FIG. 4). The representation sequence may be averaged over all time steps (based on the time steps $h_t$ 412 as shown in FIG. 4), at 506. At 508, the averaged representation sequence may be fed into the logistic regression layer 408, as shown in FIG. 4, at 508. The logistic regression layer 408 may determine a classification result, at 510. At 512, a determination whether malware exists may be made based on the classification result.

In some implementations, the current subject matter may determine the presence of malware based on the maliciousness of individual events in a sequence of events. Meanwhile, an event may be deemed malicious by being associated with certain details including, for example, filenames and/or filepaths. It should be appreciated that filenames and/or filepaths may provide important information and may be used by the dynamic analysis, such as the dynamic analysis processes discussed above. One or more filenames and/or filepaths may appear in various events such as, for example, a queryFile event, a dropFile event, a readFile event, and/or the like. When a filename or a filepath is abnormal (e.g., contains offensive words, appears randomly generated, contains strange letters, and/or the like), it is likely that the content of the file that associated with the filename or the filepath is also malicious. Moreover, an event may also be deemed malicious by being associated with an abnormal filename and/or an abnormal filepath. For example, a readFile event may be deemed malicious if that readFile event invokes an abnormal filename and/or an abnormal filepath.

In some implementations, a Markov chain may be used to analyze a filename and/or filepath associated with an event such as, for example, a queryFile event, a dropFile event, a readFile event, and/or the like. As noted earlier, an event may be deemed malicious if the event is associated with an abnormal filepath and/or filename. The Markov chain can be used to determine whether the filename and/or the filepath associated with the event is abnormal.

Figure 6:
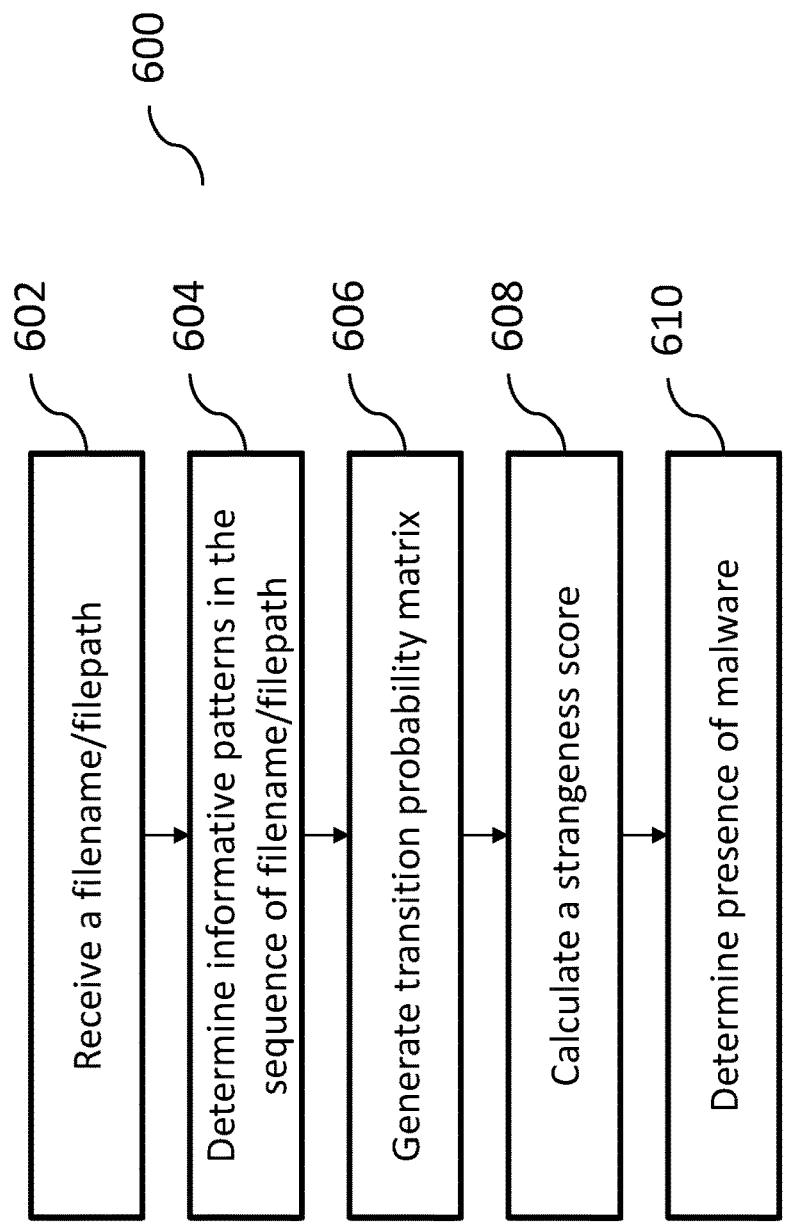
FIG. 6 illustrates an example of a process for performing analysis of a filename and/or a filepath, according to some implementations of the current subject matter.

FIG. 6 illustrates an example of a process 600 for performing analysis of a filename and/or a filepath, according to some implementations of the current subject matter. The process 600 may begin by receiving (e.g., accessing a file, receiving in a data stream, and/or the like) a filename and/or a file path of a file, at 602. At 604, at least one Markov chain may be used to determine informative sequence patterns in the filename/filepath in order to differentiate legitimate filenames/filepaths from suspicious filenames/filepaths. The Markov chain process may be a random process that undergoes transitions from one state to another on a state space. The Markov chain process may be based on a Markov property, which may be characterized as a memorylessness property, i.e., the probability distribution of the next state depends only on the current state and not on the sequence of events that preceded it. The Markov property may be defined as follows:

$$P(X_{n+1}=x|X_1=x_1, X_2=x_2, \ldots, X_n=X_n)=P(X_{n+1}=x|X_n=x_n).$$

Based on the property, the transition probability matrix $M_{ij}$ may be generated, at 606, using the following:

$$M_{ij}=P(X_j=x_j|X_i=x_i).$$

The transition probability matrix may be generated from filenames that are known to be legitimate, benign, and/or non-malicious. It should be appreciated that the transition probability matrix $M_{ij}$ may denote the conditional probability of $x_j$ occurring at the second position in a two character-length sequence provided that $x_i$ appears in the first position. The probability $P_1$ of the first character of the sequence may be calculated as the probability of first character being a certain character using the following:

$$P_1(x_1)=P(X_1=x_1).$$

At 608, a score, S, for a given sequence of characters may be calculated, using the following equation:

$$S=(\log P_1+\Sigma_{i=2}^n \log M_{i-1,i})/n,$$

wherein n is the length of the sequence.

At 610, based on the score S, a determination may be made whether the file associated with the received filename or filepath is malicious. As used herein, the abnormality of a filepath or a filename may refer to a measure of difference between the filepath or the filename and the filenames and/or filepaths that the Markov model was trained on. As one example, a filename with random characters in a random sequence is likely to be an abnormal filename. In some example embodiments, the Markov model may be trained using filenames and/or filepaths that are known to be legitimate, benign, and/or non-malicious. Thus, a trained Markov model may be able to recognize the pattern associated with legitimate, benign, and/or non-malicious filenames and/or filepaths. For instance, a filename or a filepath with a high score S may exhibit a high degree of deviation from those filenames and/or filepaths that are known to be legitimate, benign, and/or non-malicious. Accordingly, a filename or a filepath with a high score S may be deemed malicious. Meanwhile, the file that is associated with a filename or a filepath with a high score S may also be deemed malicious. Furthermore, an event (e.g., dropFile) that invokes a filename or a filepath with a high score S as well as the data object that was executed to trigger the event may both be deemed malicious.

Figure 7:
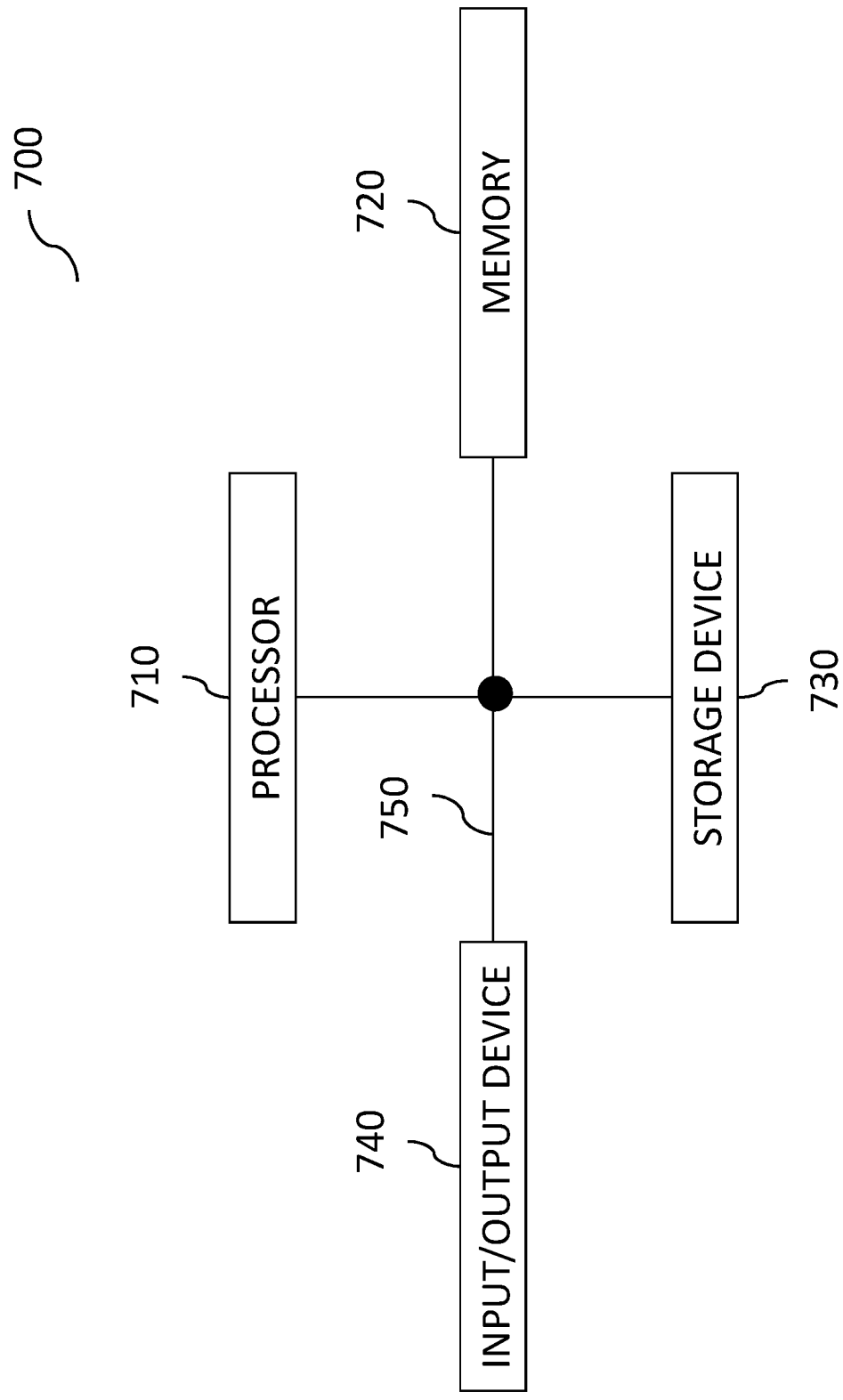
FIG. 7 illustrates an example of a system, according to some implementations of the current subject matter.

In some implementations, the current subject matter may be configured to be implemented in a system 700, as shown in FIG. 7. The system 700 may include a processor 710, a memory 720, a storage device 730, and an input/output device 740. Each of the components 710, 720, 730 and 740 may be interconnected using a system bus 750. The processor 710 may be configured to process instructions for execution within the system 700. In some implementations, the processor 710 may be a single-threaded processor. In alternate implementations, the processor 710 may be a multi-threaded processor. The processor 710 may be further configured to process instructions stored in the memory 720 or on the storage device 730, including receiving or sending information through the input/output device 740. The memory 720 may store information within the system 700. In some implementations, the memory 720 may be a computer-readable medium. In alternate implementations, the memory 720 may be a volatile memory unit. In yet some implementations, the memory 720 may be a non-volatile memory unit. The storage device 730 may be capable of providing mass storage for the system 700. In some implementations, the storage device 730 may be a computer-readable medium. In alternate implementations, the storage device 730 may be a floppy disk device, a hard disk device, an optical disk device, a tape device, non-volatile solid state memory, or any other type of storage device. The input/output device 740 may be configured to provide input/output operations for the system 700. In some implementations, the input/output device 740 may include a keyboard and/or pointing device. In alternate implementations, the input/output device 740 may include a display unit for displaying graphical user interfaces.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed implementations may be implemented in various environments. Such environments and related applications may be specially constructed for performing the various processes and operations according to the disclosed implementations or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed implementations, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

As used herein, the term "user" may refer to any entity including a person or a computer.

Although ordinal numbers such as first, second, and the like may, in some situations, relate to an order; as used in this document ordinal numbers do not necessarily imply an order. For example, ordinal numbers may be merely used to distinguish one item from another. For example, to distinguish a first event from a second event, but need not imply any chronological ordering or a fixed reference system (such that a first event in one paragraph of the description may be different from a first event in another paragraph of the description).

The foregoing description is intended to illustrate but not to limit the scope of the invention, which is defined by the scope of the appended claims. Other implementations are within the scope of the following claims.

These computer programs, which may also be referred to programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, the subject matter described herein may be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input.

The subject matter described herein may be implemented in a computing system that includes a back-end component, such as for example one or more data servers, or that includes a middleware component, such as for example one or more application servers, or that includes a front-end component, such as for example one or more client computers having a graphical user interface or a Web browser through which a user may interact with an implementation of the subject matter described herein, or any combination of such back-end, middleware, or front-end components. The components of the system may be interconnected by any form or medium of digital data communication, such as for example a communication network. Examples of communication networks include, but are not limited to, a local area network ("LAN"), a wide area network ("WAN"), and the Internet.

The computing system may include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
analyzing a series of events contained in received data, the series of events comprising events that occur during the execution of a data object, and the series of events being analyzed to at least extract, from the series of events, two or more subsequences of events, at least two of the subsequences of events being non-consecutive;
identifying a plurality of most frequent subsequences in the plurality of subsequences;
selecting the two or more subsequence of events is based on a frequency of occurrence of the plurality of most frequent subsequences exceeding a predetermined threshold;
generating a logistic regression of an average representation of the two or more subsequences of events over a plurality of time steps associated with the series of events;
determining, by a machine learning model and by using the logistic regression of the average representation of the two or more subsequences of events, a classification for the received data, the machine learning model classifying the received data based at least on whether the two or more subsequences of events are malicious; and
providing the classification indicative of whether the received data is malicious, the classification being used to make a determination of whether to continue to execute the data object in order to prevent damage to a computing system and/or software.

2. The computer-implemented method according to claim 1, wherein the two or more subsequences of events are extracted by at least:
   determining a plurality of subsequences in the series of events;
   identifying the plurality of most frequent subsequences in the plurality of subsequences; and
   selecting, from the plurality of the most frequent subsequences, the two or more subsequences of events.

3. The computer-implemented method according to claim 2, wherein the plurality of the most frequent subsequences are identified by at least applying an Apriori algorithm.

4. The computer-implemented method according to claim 3, wherein the Apriori algorithm is configured to at least:
   identify a most frequent event; and
   identify, based at least on the most frequent event, a most frequent subsequence of events, the most frequent subsequence of events including the most frequent event and at least one other event.

5. The computer-implemented method according to claim 1, wherein the machine learning model comprises a recurrent neural network.

6. The computer-implemented method according to claim 5, wherein the recurrent neural network comprises a long short term memory network.

7. The computer-implemented method according to claim 6, wherein the long short term memory network comprises a memory cell, the memory cell being configured maintain a value, the memory cell being further configured to determine, based at least on an event, whether to update, output, discard, and/or continue to maintain the value.

8. The computer-implemented method according to claim 1, wherein the machine learning model determines the classification for the received data by at least:
   generating a representation of the two or more subsequences of events;
   determining an average representation of the two or more subsequences of events over a plurality of time steps associated with the series of events;
   determining a logistic regression of an average representation of the two or more subsequences of events; and
   determining, based on the logistic regression, the classification for the received data.

9. The computer-implemented method according to claim 1 further comprising:
   determining whether the series of events includes at least one malicious event; and
   classifying the received data based at least on a presence of the at least one malicious event in the series of events.

10. The computer-implemented method according to claim 9 further comprising:
    determining that an event is malicious based at least on a filename and/or a filepath associated with the event.

11. The computer-implemented method according to claim 10, wherein the filename and/or the filepath associated with the event is analyzed based at least on a pattern associated with one or more filenames and/or filepaths that are known to be non-malicious.

12. The computer-implemented method according to claim 11, wherein the pattern associated with the one or more non-malicious filenames and/or filepaths is modeled using a Markov chain.

13. The computer-implemented method of claim 10, wherein the data object comprises a file, a function, and/or a software program.

14. The computer-implemented method according to claim 1, wherein the two or more subsequence of events comprise consecutive and/or non-consecutive events from the series of events.

15. A system comprising:
    at least one processor; and
    at least one memory including program code which when executed by the at least one processor causes operations comprising:
       analyzing a series of events contained in received data, the series of events comprising events that occur during the execution of a data object, and the series of events being analyzed to at least extract, from the series of events, two or more subsequences of events, at least two of the subsequences of events being non-consecutive;
       identifying a plurality of most frequent subsequences in the plurality of subsequences;
       selecting the two or more subsequence of events is based on a frequency of occurrence of the plurality of most frequent subsequences exceeding a predetermined threshold;
       generating a logistic regression of an average representation of the two or more subsequences of events over a plurality of time steps associated with the series of events;
       determining, by a machine learning model and by using the logistic regression of the average representation of the two or more subsequences of events, a classification for the received data, the machine learning model classifying the received data based at least on whether the two or more subsequences of events are malicious; and
       providing the classification indicative of whether the received data is malicious, the classification being used to make a determination of whether to continue to execute the data object in order to prevent damage to a computing system and/or software.

16. The system according to claim 15, wherein the two or more subsequences of events are extracted by at least:
    determining a plurality of subsequences in the series of events;
    identifying the plurality of most frequent subsequences in the plurality of subsequences; and
    selecting, from the plurality of the most frequent subsequences, the two or more subsequences of events.

17. The system according to claim 16, wherein the plurality of the most frequent subsequences are identified by at least applying an Apriori algorithm that is configured to identify a most frequent event; and identify, based at least on the most frequent event, a most frequent subsequence of events, the most frequent subsequence of events including the most frequent event and at least one other event.

18. A non-transitory computer-readable storage medium including program code, which when executed by at least one data processor, cause operations comprising:
    analyzing a series of events contained in received data, the series of events comprising events that occur during the execution of a data object, and the series of events being analyzed to at least extract, from the series of events, two or more subsequences of events, at least two of the subsequences of events being non-consecutive;
    identifying a plurality of most frequent subsequences in the plurality of subsequences;

selecting the two or more subsequence of events is based on a frequency of occurrence of the plurality of most frequent subsequences exceeding a predetermined threshold;

generating a logistic regression of an average representation of the two or more subsequences of events over a plurality of time steps associated with the series of events;

determining, by a machine learning model and by using the logistic regression of the average representation of the two or more subsequences of events, a classification for the received data, the machine learning model classifying the received data based at least on whether the two or more subsequences of events are malicious; and providing the classification indicative of whether the received data is malicious, the classification being used to make a determination of whether to continue to execute the data object in order to prevent damage to a computing system and/or software.

* * * * *